United States Patent [19]

Johnson

[11] 4,442,767

[45] Apr. 17, 1984

[54] JUICE PRESS

[76] Inventor: Rick A. Johnson, 1926 Lindsley Park Dr., San Marcos, Calif. 92069

[21] Appl. No.: 392,739

[22] Filed: Jun. 28, 1982

[51] Int. Cl.³ .............................................. B30B 9/06
[52] U.S. Cl. ....................................... 100/116; 100/266
[58] Field of Search ............... 72/453.14, 456; 100/46, 100/116, 123, 131, 134, 135, 229 A, 214, 232, 258 A, 258 R, 266, 269 R; 254/10.5, DIG. 1

[56]  References Cited

U.S. PATENT DOCUMENTS

| 1,994,060 | 3/1935 | Ashkenas | 254/DIG. 1 |
|---|---|---|---|
| 3,191,523 | 6/1965 | Fritz | 100/266 |
| 3,771,437 | 11/1973 | Brucken | 100/266 |
| 3,920,364 | 11/1975 | Cadogan-Rawlinson | 100/214 |
| 4,036,152 | 7/1977 | Bright | 100/229 A |

FOREIGN PATENT DOCUMENTS 578892  6/1933  Fed. Rep. of Germany ... 72/453.14

Primary Examiner—Philip R. Coe
Assistant Examiner—Arthur D. Dahlberg
Attorney, Agent, or Firm—Grover A. Frater

[57]  ABSTRACT

A juice press includes a fixed platen and a base held separated by a frame which serves as a track. The track guides movement of a moveable platen toward and away from the fixed platen under the influence of an extension jack mounted between the base and moveable platen and return springs which connect the base and moveable platen.

6 Claims, 5 Drawing Figures

JUICE PRESS

TECHNICAL FIELD

This invention relates to apparatus for pressing or squeezing juice from fruits and vegetables.

BACKGROUND ART

Extracting juice from fruits and vegetables is an age old practice that has been accomplished with a wide range and variety of apparatus. Most extraction is done in very large volume on a commercial basis. The apparatus for accomplishing the task is usually designed for squeezing a specific variety of fruit to produce a product that can be transported and stored for a long period of time. Whatever its specific job and character, large scale commercial juice recovery machines are not suitable for home use even on a reduced scale. Moreover, such machines do not exist for squeezing many of the vegetables.

Carrot juice is an example. Highly nutritious when fresh, and greatly valued by those who seek out nutritious food in natural form, fresh carrot juice is not available except in an occassional retail natural food store. Apparatus for squeezing juice from carrots, peas and other low liquid content materials has not been available. The pressure required to extract juice from such materials is too great. What few juice pressers are available are useful only for squeezing juices from citrus fruit and the like in which the proportion of juice is great and inefficiency is masked by the volume of juice.

The home juice extractor has relied on a combination of a small amount of pressure and much shreding and tearing with apparatus capable of extracting juice from oranges, lemons and grapefruit, and usually nothing more. In practice, most of us are denied the juice of all but a few fruits, and denied fresh juice from still fewer fruits.

A variety of food choppers and food processors make it possible to divide fruits and vegetables quite finely. They cannot provide juice, but they can condition materials to facilitate juice extraction. The amount of force required to squeeze juice from low liquid materials, even when finely divided, has made small volume, manually operated extractors impractical. Thus, notwithstanding that juice extraction is an ancient practice which is now accomplished with a wide variety of apparatus, a practical home device capable of efficient extraction of juice from a wide variety of fruits and vegetables in small volume has not been available. The invention has provided such a device.

DISCLOSURE OF INVENTION

It is an object of the invention to provide an improved low volume juice extractor—one which is capable of efficient extraction of juice from a very wide variety of fruits and vegetables including those in which the proportion of juice is quite small.

Another object is to provide such a device in a form which, while capable of powered operation, is entirely suitable for manual operation.

A further object is to provide a juice extractor which is generally capable of extracting juice free of pulp and fiber.

A still further object is to provide an extractor which can be produced in a form that permits economical manufacture, is easy to use and to clean, and which has other attributes that are required in a useful and commercially feasible product.

These several objects and features of the invention, and others that will become apparent upon examination of the drawings and description of preferred embodiments, are achieved in part, by an extraction apparatus which operates entirely by pressing and squeezing. The advantages described above are achieved notwithstanding that squeezing without twisting or other cell rupturing processing requires a maximum amount of pressing force. The invention provides a practical means for achieving high force wherefor, in contradiction to previous practice, a home sized manual juice press is made feasible.

Two opposed platens are employed. One platen is fixed to a frame in fixed spaced relation and in juxtaposition to a base which is also fixed to the frame. The second platen is moveable toward and away from the first platen. The arrangement permits the interposition of a jacking mechanism between the base and moveable platen by which the second platen may be moved with great force toward the fixed platen. The preferred embodiments employ extension jacks, jacks such as hydraulic and screw jacks whose overall length varies with the degree of extension. The hydraulic jack is preferred because it is readily available in small but powerful forms, and because release of force is accomplished by mere operation of a valve. Retraction may be accomplished using gravity or, preferably, by energy stored in a resilient element as a consequence of forcing the second platen toward the first.

A track guides movement of the second platen assembly toward and away from the first and, in the preferred form, the frame forms the track. Several frame members arranged in parallel bound a space between the first or upper platen and the base in which space the moveable platen assembly is disposed. The assembly is formed with side walls at its margins that slide along the inner surfaces of the several frame members.

The platen portion of the moveable platen assembly is a plate which spans the space between the side walls so that the side walls, which encompass the plate except at the spout, serve to retain juice. The plate is sloped slightly from a plane perpendicular to its direction of movement toward the upper platen. In the preferred embodiment, that slope is between one- and three-sixteenths of an inch per inch of plate width. Thus, it is between one and three millimeters per centimeter of plate width. Its slopes toward the entrance of a spout which is carried by the moveable platen assembly. The spout bottom is shaped to have even greater slope relative to the transverse plane—the plane which lies perpendicular to the direction of platen movement.

Thus, the completed unit in simple form uses only pressing force, has a wall around the moveable platen at the side toward the fixed platen the effect of which is to limit the degree in which the platen surfaces can be brought together, and its spout moves away from the base in operation. Those several features, which at first blush may appear as disadvantagous, contribute to what is a superior performance. Being limited to pressing, the extrusion of pulp by the device is minimized. The fact that the juice retaining wall prevents the platen faces from touching prevents undue wear and tear on pressing cloths and the like. The fact that the spout moves up instead of down, prevents the possibility of crushing a receiving receptical or from being upset on engaging such a receptical.

DESCRIPTION OF THE PREFERRED EMBODIMENT

Figure 1:
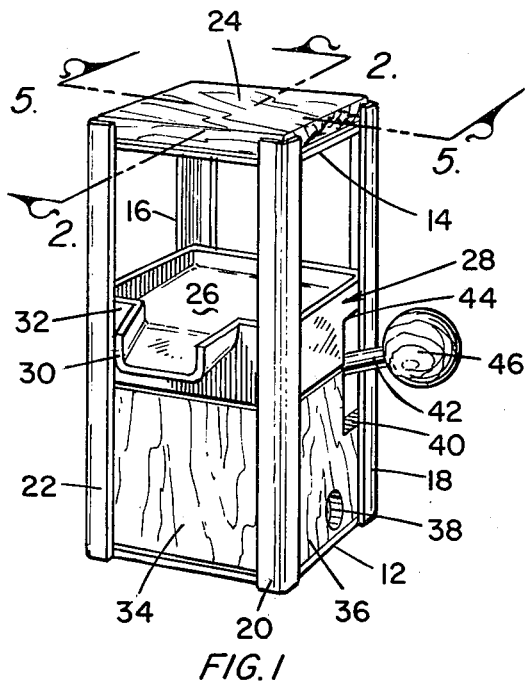
FIG. 1 is a perspective view of a preferred form of juice press according to the invention.

The preferred embodiment of the invention is intended primarily for use in the home or in retail food dispensing establishments that offer squeezed-as-you-watch fruit and vegetable juice. The unit shown in the drawing is about 38 cm tall, 23 cm by 23 cm wide and deep, has an active platen area of about 250 sq. cm, and can press up to about 0.8 liters per pressing. The unit shown has a stainless steel frame and platens and base, a hard wood top cutting board and side panels, and jack handle knob, and it is operated by a 2750 kilogram capacity hydraulic lift jack.

The invention is not limited to the embodiment of the unit selected for illustration or to the size, or to the relative sizes, described above. This example is cited to facilitate understanding and appreciation of the invention.

In FIG. 1, the press, generally designated 10 includes a square base plate 12, a square upper platen plate 14, and a frame formed, in this case, by four elongated frame members right angled in cross-section. They are numbered 16, 18, 20 and 22, respectively, and each is an angle iron.

The frame members are arranged in juxtaposition to enclose a rectangular space square in horizontal cross-section. Each is positioned such that its angle opens toward the diagonally opposite member. Each is fastened, welded in this case, at its lower end to a corner of the bottom base plate 12. Also, each frame member is welded at a point near its upper end to a respectively associated corner of the upper platen plate 14. A short length of each frame member extends above the upper platen. Together, those short lengths combine with the upper surface of the upper platen to form a retainer for a square block of wood 24. Block 24 serves to decorate the device and, if desired, it can serve as a removeable, washable cutting block for cutting and dividing the materials to be squeezed.

The lower platen 26 is part of the lower platen assembly 28 whose other elements include a spout 30 and an encompassing wall 32. The wall 32 surrounds the lower platen 26 except at the spout 30 and the sides of the wall lie parallel to the direction in which the angle iron frame members 16, 18, 20 and 22 extend. The encompassing wall is disposed within the frame and has a sliding fit with it whereby the wall and the upper platen may slide toward and away from the upper platen.

Four wooden panels are arranged at the lower end of the unit to form a skirt whose function is to hide the hydraulic jack and some return springs from view and to minimize opportunity for injury from the jack. In this embodiment, the four wood panels are formed with beveled edges. They are fitted between pairs of the angle irons and the beveled edges of each panel retains the adjacent edges of the panels on each side. The result is that all of them are positioned flush against the inner surfaces of the angle iron sides. Two panels 34 and 36 are visible in FIG. 1. Panel 36 is formed with a circular hole or cutout 38 by which access is had to the release valve of the hydraulic jack within. Another cutout or notch 40 in panel 36 accommodates the actuating arm 42 of the jack. A cooperating notch 44 is formed in wall 32 of the lower platen assembly opposite notch 40. Like notch 40, it accommodates jack arm movement. In this case, the arm handle 46 is made of hard wood.

Figure 2:
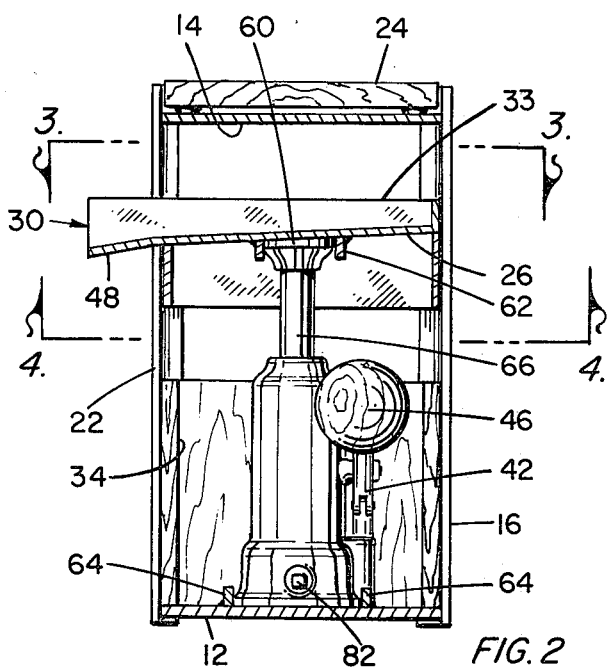
FIG. 2 is a cross-sectional view taken on line 2—2 of FIG. 1.
Figure 3:
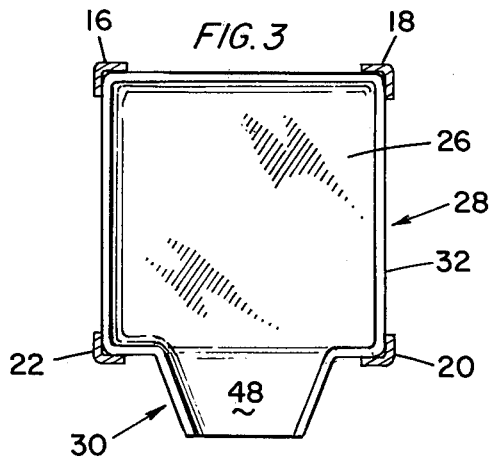
FIG. 3 is a cross-sectional view taken on line 3—3 of FIG. 2.

The lower platen assembly is shown from its upper side in FIG. 3. The spout 30 is tapered in width in the direction away from the platen plate 26. As best shown in FIG. 2, the bottom wall 48 of the spout slopes down from the level of the lower platen plate toward the outer end of the spout.

The upper platen plate 14 and the base plate 12 are in juxtaposition and lie in parallel planes perpendicular to the direction of motion of the lower platen assembly. The lower platen plate lies in a plane that is tilted with respect to the plane of the upper platen. It slopes down in the direction toward the spout such that the planes of the two platen plates intersect on a line parallel to the plane of the upper plate outside the frame at a distance determined by the position of the lower platen plate. In this embodiment, the lower platen slopes at the rate of two millimeters per centimeter relative to the plane of the fixed platen.

Figure 4:
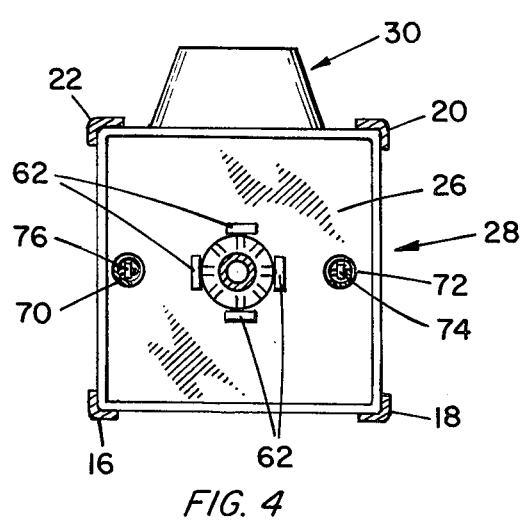
FIG. 4 is a cross-sectional view taken on line 4—4 of FIG. 2.
Figure 5:
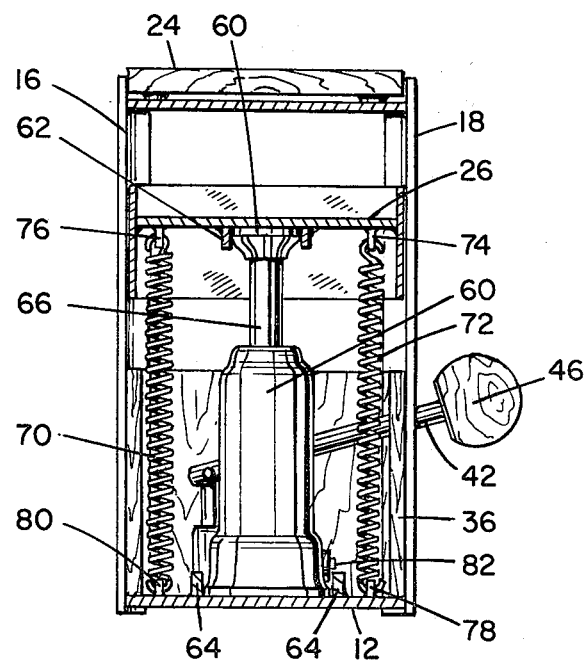
FIG. 5 is a cross-sectional view taken on line 5—5 of FIG. 1.

The hydraulic jack 60 is shown in FIGS. 2 and 5 and a portion of the upper end of the jack is shown in FIG. 4. The lower side of the moveable platen assembly 28 is shown in FIG. 4. Four locating bases 62 keep the lift pad 64 of the jack centered at the bottom of the platen plate 26. The four bosses are visible in FIGS. 2 and 5, and are seen to be relatively short. They are welded to the underside of platen 26 but are not fastened, nor is the platen, to the jack pad 60.

Similar locating bosses 64 are welded to the upper side of base plate 12. There are four of them positioned one on each of the four sides of the base of jack 60. Two are visible in each of FIGS. 2 and 5. They hold the jack centered on the base as shown.

In FIG. 1, the moveable lower platen assembly 28 is shown lowered to the upper level of the wood skirt panels 34 and 36. The jack is not visible, but it has been retracted to minimum height. In FIGS. 2 and 5, the jack is shown extended to lift the lower platen assembly about one-half the distance toward the upper platen. To raise the jack pad and the platen assembly, the pump arm is pumped up and down. That forces the piston shaft 66 upwardly against the bias of two return springs 70 and 72.

In this embodiment, the moveable platen is returned or lowered by those springs 70 and 72. Both are coiled extension springs. The upper ends of springs 70 and 72 are hooked to hangers 76 and 74, respectively, which are welded to the lower side of the lower platen plate one at each side of the set of locating bosses 62. The lower ends of the springs are hooked to hangers 80 and 78, respectively. The latter are welded to the upper face of base plate 12, one on each side of the set of locating bosses 64 below hangers 76 and 74, respectively. The two springs are stretched in sufficient degree, even when the lower platen assembly is fully retracted to retain the jack in place between the upper and lower lug sets, even when the press is inverted. To lower the moveable platen, the valve 82 of the jack is opened to release hydraulic fluid from the jack's cylinder to its reservoir.

In operation, the press is first placed upright as shown in FIG. 1, and the moveable platen assembly is lowered as shown. Valve 82 is closed. The material to be pressed is halved or sliced or diced or chopped or pureed or ground. It is placed in press cloths, in the preferred method, and the filled press cloths are placed on the moveable platen. Cloth bags may be used, but cloths folded over the material to be pressed as one would wrap a sandwich are preferred.

The hydraulic unit is then pumped by hand to lift the lower platen and to squeeze juice from the wrapped material. A few moments later, the lower platen is released by opening the return valve 80. It is lowered by the springs 70 and 72. The juice is collected in a container positioned below the spout 30. The pulp and seeds that remain in the pressing cloths is removed, and the cloths are washed. If the cloths or bags are used, only the lower face of the upper platen and the upper side of the moveable platen assembly need be cleaned, and they can be cleaned with a damp cloth.

Pressing by this method completely extracts the nutrients, enzymes, minerals, and so on, from the pulp. Air contact with juices is minimized to reduce oxidation and inhibit decomposition. These factors retain the best qualities, and flavors, of the juice.

Although I have shown and described certain specific embodiments of my invention, I am fully aware that many modifications thereof are possible. My invention, therefore, is not to be restricted except insofar as is necessitated by the prior art.

I claim:

1. A juice squeezer comprising in combination:
   an upper platen;
   a base member;
   a frame interconnecting the base member and upper platen such that they have fixed spacing and are in juxtaposition;
   a lower platen disposed between said upper platen and said base in juxtaposition with each of them;
   track means carried by said frame for guiding movement of said lower platen in a direction toward and away from said upper platen while the lower plate remains in juxtaposition with each of them;
   pressing means for forcing the lower platen to move toward the upper platen along said track means and for releasing the lower platen from said force to permit retraction of the lower platen from said upper platen;
   said pressing means comprising a jack interposed between said lower platen and said base;
   said frame being formed by a plurality of elongated frame members each fixed at respectively associated ends to said base and said upper platen, said members being spaced around the periphery of said base and said upper platen, and in which said track means is formed by said frame members;
   said lower platen comprising a plate which extends transversely across the space within said frame members; and
   the lower side of said upper platen which faces toward the lower platen, and the upper side of the plate of the lower platen which faces toward the upper platen lying at fixed angles relative to one another in non-parallel planes which intersect outside of said frame.

2. The invention defined in claim 1 in which the opposed faces of the upper and lower platens lie in respectively associated planes that slope one relative to the other at the rate of one to three millimeters difference in separation per centimeter of face width.

3. The invention defined in claim 1 in which the face of said upper platen which faces the lower platen is substantially perpendicular to the direction of motion of said lower platen toward and away from said upper platen.

4. The invention defined in claim 3 in which said lower platen further comprises a retaining wall which extends around the margins of said plate within said frame members and, except at the point at the edge of said plate which lies at greatest distance from said upper platen, is continuous around and extends above the margins of said plate and has its upper margins parallel with the plane of said upper platen.

5. The invention defined in claim 1 which further comprises a cutting board carried by said frame and overlying said fixed platen.

6. In an apparatus for squeezing juice from fruit;
   a frame formed by four elongated right angle members arranged in juxtaposition and in parallel each with its side portions lying on two adjacent sides of a rectangular area defined as the space between said right angle members;
   a fixed platen in the form of a plate lying in a plane perpendicular to said four angle members and between them; and
   a moveable platen assembly moveable between upper and lower positions and comprising a four sided moveable platen wall slidably disposed in the space within said four angle members with its sides lying in planes parallel to said side portions of said angle members, the moveable platen further comprising a platen plate spanning the space within said wall and fixed thereto such that it lies nearly parallel but significantly out of parallel with said fixed platen, at least two opposing sides of said moveable platen extending upwardly such that their upper edges are parallel to said fixed platen and are engaged with said upper platen at the upper limit of moveable platen positions.

* * * * *